US 11,083,989 B2

(12) United States Patent
Jakobsson et al.

(10) Patent No.: US 11,083,989 B2
(45) Date of Patent: Aug. 10, 2021

(54) GAS TREATMENT MONOLITH ARTICLE

(71) Applicant: Haldor Topsøe A/S, Kgs. Lyngby (DK)

(72) Inventors: Niklas Bengt Jakobsson, Kågeröd (SE); Joakim Reimer Thøgersen, Virum (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 15/312,000

(22) PCT Filed: May 28, 2015

(86) PCT No.: PCT/EP2015/061778
§ 371 (c)(1),
(2) Date: Nov. 17, 2016

(87) PCT Pub. No.: WO2015/185424
PCT Pub. Date: Dec. 10, 2015

(65) Prior Publication Data
US 2017/0080376 A1    Mar. 23, 2017

(30) Foreign Application Priority Data

Jun. 4, 2014 (DK) .......................... PA 2014 00302

(51) Int. Cl.
  *B01D 53/02*    (2006.01)
  *B01D 53/04*    (2006.01)
  (Continued)

(52) U.S. Cl.
  CPC ......... *B01D 53/0462* (2013.01); *B01D 53/02* (2013.01); *B01J 20/08* (2013.01);
  (Continued)

(58) Field of Classification Search
  CPC .......... B01D 2253/104; B01D 2253/25; B01D 2253/304; B01D 2253/311;
  (Continued)

(56) References Cited

U.S. PATENT DOCUMENTS 4,402,717 A * 9/1983 Izumo ................... B01D 53/06
                                                                  96/118
4,433,981 A    2/1984 Slaugh et al.
(Continued)

FOREIGN PATENT DOCUMENTS

CA    2 769 060 A1    8/2013
EP        0867217 A2    9/1998
(Continued)

OTHER PUBLICATIONS

Office Action (Communication pursuant to Article 94(3) EPC) dated Jun. 5, 2020, by the European Patent Office in corresponding European Application No. 15 726 921.8-1104, (5 pages).

*Primary Examiner* — Christopher P Jones
(74) *Attorney, Agent, or Firm* — Buchanan Ingersoll & Rooney P.C.

(57) ABSTRACT

The invention relates to a gas treatment monolith article, said gas treatment article comprising: a full body porous material comprising a porous substrate and an aluminium oxide coating homogeneously distributed throughout said porous substrate, wherein said porous substrate is a fibrous material; and at least one acid gas absorption active component or a precursor thereof impregnated into said porous aluminium oxide coated substrate. The invention further relates to uses of the gas treatment monolith article of the invention.

15 Claims, 2 Drawing Sheets

(51) Int. Cl.
| | | |
|---|---|---|
| *B01J 20/32* | (2006.01) | |
| *B01J 20/28* | (2006.01) | |
| *B01J 20/34* | (2006.01) | |
| *B01J 20/08* | (2006.01) | |
| *B01J 20/10* | (2006.01) | |
| B01D 53/62 | (2006.01) | |
| B01D 53/82 | (2006.01) | |

(52) U.S. Cl.
CPC ......... *B01J 20/103* (2013.01); *B01J 20/2804* (2013.01); *B01J 20/28042* (2013.01); *B01J 20/28045* (2013.01); *B01J 20/3204* (2013.01); *B01J 20/3236* (2013.01); *B01J 20/3433* (2013.01); *B01J 20/3483* (2013.01); *B01D 53/62* (2013.01); *B01D 53/82* (2013.01); *B01D 2253/104* (2013.01); *B01D 2253/25* (2013.01); *B01D 2253/304* (2013.01); *B01D 2253/311* (2013.01); *B01D 2253/342* (2013.01); *B01D 2253/3425* (2013.01); *B01D 2257/504* (2013.01); *B01D 2258/0283* (2013.01); *Y02C 20/40* (2020.08)

(58) Field of Classification Search
CPC ...... B01D 2253/342; B01D 2253/3425; B01D 2257/504; B01D 2258/0283; B01D 53/02; B01D 53/0462; B01D 53/62; B01D 53/82; B01J 20/08; B01J 20/103; B01J 20/2804; B01J 20/28042; B01J 20/28045; B01J 20/3204; B01J 20/3236; B01J 20/3433; B01J 20/3483; Y02C 10/08; Y02C 20/40

See application file for complete search history.

(56) References Cited

U.S. PATENT DOCUMENTS

| | | | | |
|---|---|---|---|---|
| 4,871,607 A * | 10/1989 | Kuma | ............. | B01D 53/261 428/186 |
| 4,886,769 A * | 12/1989 | Kuma | ............. | B01D 53/06 502/62 |
| 5,194,078 A * | 3/1993 | Yonemura | ........ | C04B 38/0006 55/466 |
| 5,194,414 A * | 3/1993 | Kuma | ............. | B01D 53/02 502/439 |
| 5,308,457 A * | 5/1994 | Dalla Betta | ........ | B01D 53/8668 422/169 |
| 5,322,537 A * | 6/1994 | Nakamura | ......... | B01D 39/2086 55/498 |
| 5,569,455 A * | 10/1996 | Fukui | ............. | B01D 53/945 422/174 |
| 5,683,532 A * | 11/1997 | Kuma | ............. | B01D 53/02 156/184 |
| 5,908,480 A * | 6/1999 | Ban | ............. | B01D 39/2041 55/482 |
| 6,365,092 B1 * | 4/2002 | Backa | ............. | B01D 53/885 264/628 |
| 7,052,532 B1 * | 5/2006 | Liu | ............. | B01D 39/2075 55/520 |
| 8,475,752 B2 * | 7/2013 | Wan | ............. | B01D 53/9422 423/213.2 |
| 10,072,549 B2 * | 9/2018 | Inaguma | ............. | F01N 3/281 |
| 2002/0141912 A1 * | 10/2002 | Murrell | ............. | B01D 53/8631 422/177 |
| 2003/0224933 A1 * | 12/2003 | Kondo | ............. | B01D 53/885 502/439 |
| 2004/0134353 A1 * | 7/2004 | Gillingham | ........ | B01D 39/1623 95/273 |
| 2005/0107244 A1 * | 5/2005 | Ichikawa | ........... | B01D 53/885 502/60 |
| 2005/0160710 A1 * | 7/2005 | Taoka | ............. | B01D 46/2422 55/523 |
| 2006/0057046 A1 * | 3/2006 | Punke | ............. | B01D 53/944 423/215.5 |
| 2007/0098914 A1 * | 5/2007 | Ingram-Ogunwumi | | B01J 35/04 427/487 |
| 2007/0144828 A1 * | 6/2007 | Galligan | ............. | F01N 1/081 181/258 |
| 2007/0149398 A1 | 6/2007 | Jones et al. | | |
| 2009/0110873 A1 * | 4/2009 | Jiang | ............. | B01D 71/60 428/116 |
| 2009/0193796 A1 * | 8/2009 | Wei | ............. | B01D 53/9445 60/297 |
| 2009/0208394 A1 * | 8/2009 | Li | ............. | B01D 53/944 423/213.2 |
| 2010/0129547 A1 | 5/2010 | Jiang et al. | | |
| 2010/0154636 A1 * | 6/2010 | Liu | ............. | B01D 53/02 95/139 |
| 2010/0186375 A1 * | 7/2010 | Kazi | ............. | B01D 53/944 60/274 |
| 2011/0072971 A1 | 3/2011 | Billingsley et al. | | |
| 2011/0123421 A1 * | 5/2011 | Grubert | ............. | B01D 53/944 423/212 |
| 2011/0173950 A1 * | 7/2011 | Wan | ............. | B01D 53/9418 60/274 |
| 2011/0179948 A1 * | 7/2011 | Choi | ............. | B01D 53/02 95/114 |
| 2011/0289955 A1 * | 12/2011 | Okano | ............. | F24F 3/1423 62/271 |
| 2011/0296872 A1 * | 12/2011 | Eisenberger | ......... | B01D 53/08 62/640 |
| 2011/0305617 A1 * | 12/2011 | Lee | ............. | B01D 53/8668 423/245.1 |
| 2012/0216676 A1 * | 8/2012 | Addiego | ............. | B01D 53/02 95/139 |
| 2013/0095996 A1 * | 4/2013 | Buelow | ............. | B01J 20/3272 502/62 |
| 2013/0259774 A1 * | 10/2013 | Narushima | ............. | B01J 10/00 422/607 |
| 2013/0323419 A1 * | 12/2013 | Chang | ............. | B01D 63/066 427/243 |

FOREIGN PATENT DOCUMENTS

| | | |
|---|---|---|
| EP | 1 582 248 A1 | 10/2005 |
| JP | S61-227822 A | 10/1986 |
| KR | 10-2013-0131970 A | 12/2013 |
| WO | 02/66152 A2 | 8/2002 |
| WO | 05/016497 A1 | 2/2005 |
| WO | WO 2013/052637 A2 | 4/2013 |

* cited by examiner

GAS TREATMENT MONOLITH ARTICLE

The present invention relates to a gas treatment monolith article and uses thereof. In particular, the present invention relates to a gas treatment monolith article for removing acid gas from e.g. flue gas, ambient air or a combination thereof.

The invention is in particular directed to a gas treatment monolith article for capturing acid gas, such as $CO_2$, in a swing operation, e.g. a temperature swing operation or pressure swing operation. The swing operation constitutes absorbing acid gas from flue gas, ambient air or a mixture thereof under ambient pressure and temperature. After loading the monolith article with acid gas, the monolith is regenerated by e.g. raising the temperature in the monolith, for example by using steam, in order for the acid gas to desorb. Subsequently, new absorption/desorption cycles take place.

An absorption filter comprising at least one thin plate honeycomb filtering medium carrying a gas-adsorbing medium thereon is known from EP1582248. The absorption filter of EP1582248 comprises a fibrous substrate having a corrugated honeycomb structure, the fibrous substrate carrying a gas-adsorbing medium thereon.

Alternatively, cordierite based monoliths may be used for gas treatment. A commonly used monolith is an alumina coated cordierite monolith having up to 300 or 400 cells per square inch (CPSI).

It is an object of the invention to provide a gas treatment monolith article having a more efficient removal of acid gas. It is another object of the invention to provide a gas treatment monolith article having an improved removal of acid gas for acid gas levels above 350 ppm. These and other objects are achieved by the present invention according to the following features in correspondence with the appended claims.

Pursuant to the above object, the invention provides a gas treatment monolith article, where the gas treatment article comprises a full body porous material comprising a porous substrate and an aluminium oxide coating homogeneously distributed throughout the porous substrate, wherein the porous substrate is a fibrous material; and at least one acid gas absorption active component or a precursor thereof impregnated into said aluminium oxide coated porous substrate.

A high load of alumina per $m^3$ monolith (full body monolith vs. coated) enables a larger absorption capacity compared to a cordierite monolith. A large porosity in the fibrous material of the porous support and large pores enables fast mass transfer of acid gas into the material. A low thermal inertia renders a low energy penalty for the thermal regeneration of the gas treatment monolith article, e.g. when the gas treatment monolith article of the invention is used in a temperature swing absorption process. A low weight provides a less costly reactor construction, e.g. in comparison with cordierite monolith articles.

It should be noted that the term "a full body porous material" is meant to denote a material in the form of a porous substrate having a coating, where the coating is homogeneously distributed throughout the whole of the fibrous porous substrate. Typically, the fibrous porous substrate is wash-coated with aluminium oxide. This material is a full body porous material in the sense that the interstices between fibers of the fibrous material provide a support material which in itself is porous, whilst the aluminium oxide coating distributed throughout the fibrous material is also porous in itself. Moreover, the term "acid gas" denotes any gas mixture containing significant quantities of hydrogen sulfide ($H_2S$), carbon dioxide ($CO_2$), and/or similar acidic gases.

It is noted, that the fibrous material may be a woven or non-woven fabric.

The coating is thus homogeneously distributed within the channel walls between adjacent channels, viz. from one side of the channel wall throughout the wall to the opposite side of the channel wall in question. The term "aluminium oxide coated porous substrate" is meant to denote a full body porous material comprising a porous substrate having an aluminium oxide coating, where this aluminium oxide coating is homogeneously distributed within the porous substrate.

In an embodiment, the monolith article comprises one or more sheets of said full body porous material, where the one or more sheets is/are shaped so as to form a plurality of channels. The monolith article may e.g. comprise one or more substantially flat sheets of full body porous material alternating with one or more sheets of full body porous material having shapes so as to form channels or passageways when stacked to e.g. a square form or when coiled in spiral form to create a cylindrical monolith. The flat sheets are retaining layers serving to maintain the shaped sheets in its/their shaped condition. However, alternatively the one or more sheets may be shaped so that the shapes themselves create a plurality of channels, when forming a monolith from the sheet(s). An example of such a shape would be a sheet having irregular or spaced corrugations. The channels are passageways that are straight or follow a curved path, but tend to be generally unobstructed.

The shape of the channels as seen from an end need can be any appropriate form, e.g. substantially triangular, substantially square, substantially hexagonal or in a corrugated or fluted form.

The array of channels is typically a repeated pattern; however, the invention is not limited to repeated or regular patterns of channels.

In an embodiment the gas treatment monolith article comprises a corrugated sheet of said full body porous material and a substantially flat sheet of said full body porous material.

It should also be noted that the gas treatment monolith article typically comprises a plurality of corrugated sheets and a plurality of substantially flat sheets of full body porous material, cut and stacked to form the monolith article. The monolith article may e.g. be cylindrical or cubic; however, any appropriate form or shape may be used.

The corrugated sheet and the substantially flat sheet of porous material both are of full body porous material, i.e. of a porous substrate having a coating homogeneously distributed throughout the whole of the porous substrate. As mentioned above, channels or passageways may be formed between the corrugated sheet of porous material and the substantially flat sheet of porous material. Typically, the monolith article comprises a plurality of pairs of sheets or plates of full body porous material and sheets of corrugated sheet of full body porous material, e.g. stacked and arranged in a container.

Even though an alumina coated cordierite monolith can be made with 300-400 CPSI, whilst monolith articles with full body porous material, such as monolith articles with corrugated sheets and substantially flat sheets of full body porous material, are restricted to lower CPSI values, the monolith article according to the invention provides superior performance in dynamic acid gas uptake, especially for acid gas levels above 350 ppm.

Even though a higher CPSI value enables faster mass transfer from a gas to the active component of the monolith, the back bone or the constituting material of the monolith does not contribute to the absorption of the acid gas, when cordierite based monoliths are used.

In the case of the gas treatment monolith article, the higher load and the higher porosity of the monolith surprisingly compensates for the lower CPSI and thus provides superior performance in dynamic acid gas uptake in the process, especially for acid gas levels above 350 ppm.

It should be noted that the term "corrugated sheet" is meant to denote a sheet having typically U-formed or V-formed indentations. However, the indentations or corrugations can be alternative shapes, such as triangular, rectangular, pentagonal, hexagonal, or any other appropriate shape suitable for providing channels or passageways between adjacent corrugated sheets and/or between a substantially flat sheet and the corrugated sheet.

In an embodiment, the fibrous material of ceramic paper, ceramic cardboard or a paper of high silica content glass enforced with E-glass fibers. These materials are examples of suitable inorganic fibrous materials. In this embodiment, it should be noted that the full body porous material comprises a substrate of ceramic paper, ceramic cardboard or a paper of high silica content glass enforced with E-glass fibers, where the substrate comprises an aluminium oxide coating homogeneously distributed throughout the substrate.

In an embodiment, the aluminium oxide coated full body porous material has porosity of about 45% or above. The porosity of the aluminium oxide coated full body porous material may be e.g. 50% or 60%, depending on the process of manufacture thereof. Thus, the porosity of the full body porous material in the form of a porous substrate and an aluminium oxide coating homogeneously distributed throughout the porous substrate is about 45% or above, such as e.g. 50% or 60%. Obviously, it is essential that the aluminium oxide full body porous material exhibits porosity which permits gasses to travel relatively easily therethrough without creation of any significant degree of back pressure, whilst being able to permit trapping of acid gas.

In an embodiment least one acid gas absorption active component or a precursor thereof is an amine. When the porous material comprises a combination of aluminium oxide coating and an amine as an acid gas absorption active component, surprisingly effective acid gas absorption is achieved, when the monolith article is used in a process for absorbing acid gas.

In an embodiment, the amine is an amine with hyper branched amino silica type components.

In an embodiment the aluminium oxide is $\gamma$-$Al_2O_3$. This aluminium oxide has a surface area of e.g. 250 $m^2$/g. The surface area of the aluminium oxide $\gamma$-$Al_2O_3$ is preferably larger than 150 $m^2$/g, such as for example 250 $m^2$/g.

In an embodiment at least one acid gas absorption active component or a precursor thereof is in aqueous solution or solved in an organic solvent when it is impregnated into the aluminium oxide coated full body porous material. The organic solvent is e.g. methanol or toluene.

In an embodiment, at least one acid gas absorption active component or a precursor thereof is bound to the porous aluminium oxide coated substrate by physical adsorption, covalent binding or in situ polymerization.

In an embodiment, the full body porous material has a wall thickness of between about 0.2 mm and about 0.6 mm. Thus, the porous substrate with the aluminium oxide coating distributed homogeneously throughout it has a wall thickness of between about 0.2 mm and about 0.6 mm.

In an embodiment, the corrugated sheet of said full body porous material has a wavelength of between about 2 mm and about 6 mm and a corrugation height of between about 0.65 mm and about 6 mm.

In an embodiment, a plurality of channels is formed between the corrugated sheet of full body porous material and the substantially flat sheet of full body porous material, and a hydraulic diameter of the channels is between about 0.6 mm and about 6 mm.

In an embodiment, the gas treatment monolith article is a honeycomb article. The term "honeycomb article" or "honeycomb monolith" is meant to denote an article/a monolith having an axis along which it can conduct a flow of fluid, where the honeycomb article or honeycomb monolith extends along the axis and is delimited by two opposed ends. The honeycomb article or honeycomb monolith typically has a repeated pattern of channels, which can be seen from an end of the honeycomb article or honeycomb monolith. The form of the channels as seen from an end need can be any appropriate form, e.g. substantially triangular, substantially square, substantially hexagonal or in a corrugated or fluted form.

According to another aspect, the invention relates to the use of a gas treatment monolith article according to the invention for temperature swing absorption process for gas treatment, in particular gas separation.

In an embodiment, the invention relates to use of the gas treatment monolith article according to the invention for capturing acid gas from a flue gas, ambient air or a combination thereof, in particular for a flue gas, ambient air or a combination thereof having an acid gas level of about 350 ppm or above.

The invention is further illustrated by reference to the attached figures, where:

Throughout the figures, like reference numerals denote like components or features.

Figure 1:
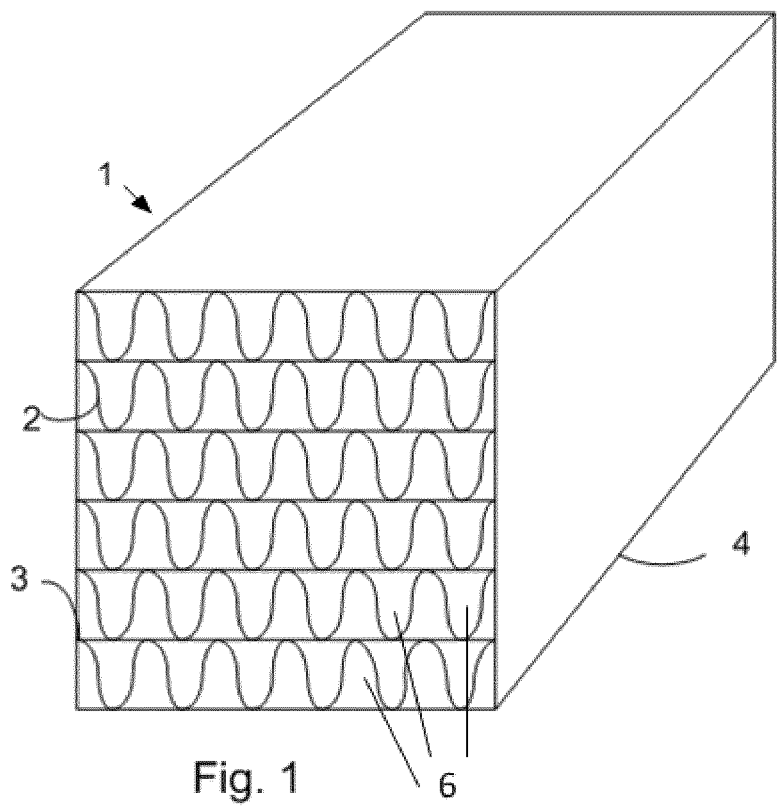
FIGS. 1 and 2 are schematic drawings showing a view of a gas treatment article of the present invention, seen from the end or in cross-section.
Figure 2:
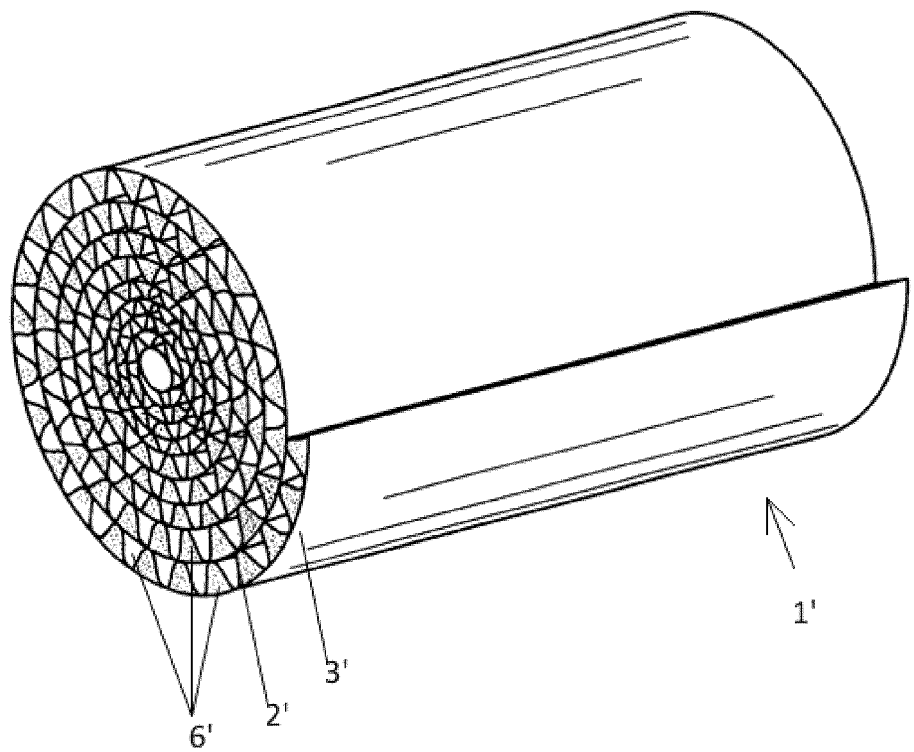
Figure 3:
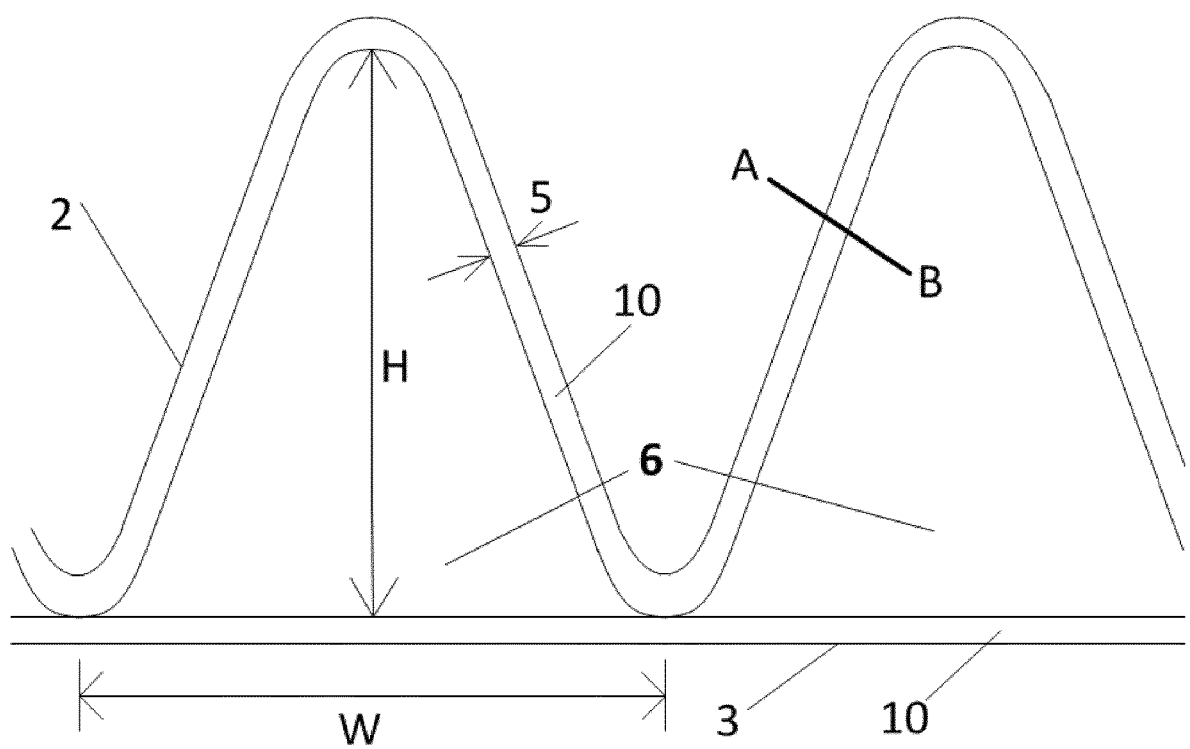
FIG. 3 is an enlarged view of the cross-sectional view of the gas treatment article of the present invention.

A specific, non-limiting embodiment of the invention is shown in FIGS. 1, 2 and 3. FIGS. 1 and 2 are schematic drawings showing a view of a gas treatment article of the present invention, seen from the end or in cross-section. FIG. 1 shows a gas treatment monolith article 1 in the shape of a box, whilst FIG. 2 shows a spirally wound gas treatment article 1' in cylindrical shape. The gas treatment articles 1, 1' comprise full body porous material in the form of porous substrates coated with an aluminium oxide throughout the whole of the substrates, and impregnated with an amine. The substrates of the monolith article of FIGS. 1 and 2 are corrugated sheets of full body porous material 2, 2', also denoted "corrugated sheets", which are supported and separated from each other by substrates 3, 3' of substantially flat sheets of full body porous material, also denoted "liners" or "plates". The corrugated and flat sheets 2,2',3,3' are full body porous material, i.e. they each comprise a porous substrate and an aluminium oxide coating homogeneously distributed throughout the substrate, and each of the sheets 2,2',3,3' are impregnated with an amine.

In the embodiment shown in FIG. 1, the sheets 2, 3 are mounted in a shell 4, whilst the embodiment of FIG. 2 shows the monolithic gas treatment article as a spirally wound pair of corrugated sheet 2,2' and flat sheet 3, 3'. The substrates of the full body porous material of the corrugated sheets 2, 2' and of the substantially flat sheets 3, 3', e.g. of an inorganic fibrous material, coated with an aluminium oxide and impregnated with an amine. It should be noted, that even though FIG. 1 shows that monolith article comprises porous substrates of the gas treatment article 1 in the form of alternating corrugated sheets and flat sheets, the invention is not limited to this configuration. The invention relates to full body monoliths in general and is not limited to corrugated sheets. Moreover, more than one corrugated sheet of porous material could be placed between flat sheets of porous material, and the corrugation patterns of different corrugated sheets need not be identical.

The full body porous substrate has a wall density of at least 30 g/l but not more than 300 g/l and a porosity of at least about 45%.

The porous substrate of the full body porous material is a fibrous material of ceramic paper, ceramic cardboard or a paper of high silica content glass enforced with E-glass fibre.

The gas treatment monolith article of the embodiment in FIG. 1 is a honeycomb shaped monolith, due to its repeating structure. FIG. 1 also shows that the honeycomb shaped monolith prepared according to the invention comprises corrugated sheets of porous material stacked with flat sheets of porous material to form a quadratic block with a plurality of parallel through flow channels or passageways 6 formed between the corrugations of the corrugated sheets and the flat sheets. Thus, this invention provides a honeycomb monolith for acid gas absorption in a gaseous stream with a plurality of flow through channels 6. In FIG. 1 the substrate is made up from cut and stacked sheets of wave and liner into quadratic blocks, whilst FIG. 2 shows a cylindrical form, also with passageways 6'. However, it should be noted that any other appropriate form of the gas treatment monolith article is conceivable.

Exemplary dimensions for the gas article shown in FIG. 1 are 466 mm×466 mm×322 mm or 466 mm×466 mm×560 mm, where 322 mm and 560 mm are the height (when the gas flows in a vertical direction). However, the height may be as small as about 100 mm, such that the dimensions are 466 mm×466 mm×100 mm. This is due to the efficiency of the monolith article of the invention: since the monolith article of the invention is particularly efficient in treating gasses with acid gas content, in particular gasses having about 350 ppm or more acid gas, the length of monolith article experienced by the gas may be reduced compared to traditional monolith articles for gas treatment.

The corrugated sheet of porous material may be an inorganic fibrous material. An example of such inorganic fibrous material is a paper made from glass fibres with high silicon content. Alternatively, it is an E-glass fibre monolithic paper. The substrate has a low density and a high porosity. The substrate has a wall thickness of between 0.2 mm and about 0.6 mm. In the embodiments of FIGS. 1 and 2, the substantially flat sheets of porous material 3, viz. the liners or plates, have substantially the same composition and thickness as the corrugated sheets of porous material 2. The paper or substrate is coated with of aluminium oxide. The aluminium oxide coated porous substrate does not contain a separate layer of aluminium oxide covering the entire outer surfaces of the substrate. Instead, the aluminium oxide enters into the material and/or the pores of the substrate. Thus, the aluminium oxide coated porous substrate is also a porous material, like the substrate was a porous material prior to the coating with aluminium oxide. However, typically, the porosity of the aluminium oxide coated porous substrate is reduced compared with the porosity of the corrugated and substantially flat sheets of porous material prior to the coating with aluminium oxide.

As an example only, the fibrous material of the porous substrate of the full body porous material is a ceramic paper.

One way of preparing ceramic paper is by dispersing fibers of alumina ($Al_2O_3$) having an average fiber diameter of e.g. 3 microns and a length of about 0.01 to 10.0 mm in water to form a slurry or suspension. Wood fibers and/or other fibers, such as Kevlar wet-pulp fibers, may be mixed with water and added to the alumina fiber. A binder may also be added to the suspension. The pH may be reduced to 6.0 with the addition of aqueous alum. The slurry may subsequently be formed into a paper-like sheet using a conventional papermaking mold machine. The sheet is subsequently dried, e.g. at a temperature of 150° C. The resulting dried ceramic paper sheet could have a porosity of 90%.

Multiple sheets of paper may be cut into sections having substantial equal size. One strip may be corrugated or pleated on a pleating/corrugating machine, and the peaks of the corrugations may be adhered to a flat strip section with an adhesive consisting e.g. of a high viscosity colloidal suspension of alumina and latex adhesive. Ends of the channels defined by the flutes at one edge of the corrugated sheet may then be sealed by alumina complex cement.

The combined layers may be stacked or rolled into spiral form and the ends of the channels at the opposite edge of the corrugated sheet may be sealed to create opposing flow channels. The filter structure may be dipped in a resin and subsequently dried and heated to set the resin. Subsequently, the filter structure may be heated to a temperature of e.g. 1000° C. in order to convert organic components to carbon char. Afterwards, a the aluminium oxide coating may be applied using e.g. a conventional chemical vapor deposition process. The resulting filter structure has porosity of 45% or above. The substrate of this example comprises haphazardly arranged ceramic fibers; however, alternatively, the fibrous material may be a woven material manufactured from ceramic fiber yarn in an ordered arrangement. The fibers of alumina or the ceramic fiber yarn may be re enforced with E-glass.

The aluminium oxide coated porous substrate 2,2',3,3' is impregnated with at least one acid gas absorbing active component or a precursor thereof (not shown in the figures), for example an amine, such as an amine comprising hyperbranched amino silica type components. The acid gas absorbing active component or a precursor thereof is e.g. a $CO_2$ absorbing active component or a precursor thereof. The amine component may be bound to the aluminium oxide coated substrate through physical absorption, covalent binding or in situ polymerization FIG. 3 is an enlarged view of the cross-sectional view of the gas treatment article 1 of the present invention. The gas treatment monolith article 1 comprises a plurality of pairs of sheets or plates 3 of porous material and sheets of corrugated sheet of porous material 2, stacked and arranged in a container, as shown in FIG. 1. FIG. 3 shows an enlarged cross-section of a portion of one such pair. As seen in FIG. 3, the wash coated substrate of a honeycomb gas treatment monolith article according to the invention is composed of a corrugated sheet or plate 2 of porous material and a liner or plate 3 of porous material of the same composition as the corrugated sheet.

The wall thickness of the sheet of flat porous material 2 in the final wash coated gas treatment article 1 as claimed in the claims is determined/measured at a point outside the region, where the sheet 2 touches the corrugated sheet 3.

The wall thickness of the corrugated sheet 3 of porous material in the final wash coated gas treatment article, impregnated with an acid gas absorption active component or a precursor thereof, is determined or measured at a point in the tangential region of the corrugations. Such a point is indicated by the arrows 5. The wall thickness of the fibrous aluminium oxide coated substrate is between about 0.2 mm and about 0.6 mm. This is the case for both the corrugated sheet of porous material 2 and for the flat sheet of porous material 3.

The wavelength in the final wash coated gas treatment, impregnated with an acid gas absorption active component or a precursor thereof, is e.g. determined or measured between two troughs, such as indicated by the reference "W" in FIG. 3. The wavelength of the corrugated substrate 2 is between about 2 mm and about 5 mm.

The corrugation height H in the final aluminium oxide coated gas treatment article, impregnated with an acid gas absorption active component or a precursor thereof, is determined/measured between the inner surface of the substantially flat porous liner 3 and the inner surface of corrugations of the corrugated porous substrate. The corrugation height H of the final aluminium oxide coated gas treatment article is between about 0.65 mm and about 6 mm.

The fibrous aluminium oxide coated substrate 2 is a full body porous material. This means that gas at the position A in FIG. 3 may pass through the substrate 2 to the position B. However, it should be noted that the gas would typically not move along a straight line as in FIG. 3.

The gas treatment monolith article of the present invention is especially useful for acid gas removal from flue gas, ambient air or a combination thereof, in particular for gasses having an acid gas level of 350 μm or above.

The gas treatment monolith articles of the invention represent technical advantages when operating in an acid gas capture plant where the capture of acid gas is based on a swing operation. The swing operation constitutes absorption of acid gas from flue gas, ambient air or a mixture of ambient air and flue gas in the gas treatment monolith article under ambient pressure and temperature. After loading the gas treatment monolith article with acid gas, the gas treatment monolith article is regenerated by raising the temperature in the gas treatment monolith article using for example low to medium pressure steam, whereby the acid gas desorbs. Subsequently, a new absorption cycle can start.

Typically, the aluminium oxide coating is supported on the substrate by applying a wash coat on the substrate, drying the wash coat, and optionally calcining in a controlled atmosphere. Subsequently, the substrate comprising the aluminium oxide wash coat is impregnated with a solution acid gas capturing material or a precursor thereof.

The gas treatment monolith article can thus be prepared by a method comprising the consecutive steps of:

(a) Cutting and stacking a substrate composed of alternating corrugated ceramic paper sheets and flat ceramic paper sheets to a substrate block in the form of e.g. a quadratic or cylindrical body;

(b) inserting the substrate block into an appropriate container, e.g. a quadratic or cylindrical container, having smaller dimensions than the substrate;

(c) wash coating the substrate block with an aluminium oxide;

(d) optionally, calcining the wash coated substrate block;

(e) impregnating the wash coated block with a solution of acid gas absorption active components or precursors thereof;

(f) drying and optionally calcining the block of step (e)

(g) removing the body from the container, thereby obtaining the honeycomb monolith article for gas treatment.

The gas treatment monolith article of the invention may be placed in a reactor for alternating acid gas absorption and desorption in a temperature swing operation using low to medium pressure steam in the desorption step. The gas treatment monolith article of the invention is well-suited for treatment of a gas containing a mix of air and flue gas from a power plant, such as a natural gas driven gas turbine plant.

The invention claimed is:

1. A gas treatment monolith article, said gas treatment article comprising:
   a full body porous material comprising a porous substrate and an aluminium oxide coating homogeneously distributed throughout said porous substrate, wherein said porous substrate is a fibrous material; and
   at least one acid gas absorption active component or a precursor thereof impregnated into said porous aluminium oxide coated substrate, wherein said at least one acid gas absorption active component or a precursor thereof is an amine capable of non-catalytical absorption of an acid gas at ambient temperature,
   wherein said aluminium oxide coated full body porous material has porosity of about 45% or above,
   wherein said fibrous material is ceramic paper, ceramic cardboard or a paper of high silica content glass enforced with E-glass fibers.

2. The gas treatment monolith article according to claim 1, wherein said monolith article comprises one or more sheets of said full body porous material, wherein said one or more sheets is/are shaped so as to form a plurality of channels.

3. The gas treatment monolith article according to claim 1, wherein said monolith article comprises a corrugated sheet of said full body porous material and a substantially flat sheet of said full body porous material.

4. The gas treatment monolith article of claim 1, wherein said amine is an amine with hyper branched amino silica type components.

5. The gas treatment monolith article according to claim 1, wherein said aluminium oxide is γ-$Al_2O_3$.

6. The gas treatment monolith article according to claim 1, wherein said at least one acid gas absorption active component or a precursor thereof is in aqueous solution or solved in an organic solvent when it is impregnated into said porous aluminium oxide coated substrate.

7. The gas treatment monolith article according to claim 1, wherein said at least one acid gas absorption active component or a precursor thereof is bound to the porous aluminium oxide coated substrate by physical adsorption, covalent binding or in situ polymerization.

8. The gas treatment monolith article according to claim 1, wherein said full body porous material has a wall thickness of between about 0.2 mm and about 0.6 mm.

9. The gas treatment monolith article according to claim 3, wherein said corrugated sheet of said full body porous material has a wavelength of between about 2 mm and about 6 mm and a corrugation height of between about 0.65 mm and about 6 mm.

10. The gas treatment monolith article according to claim 3, wherein a plurality of channels is formed between said corrugated sheet of full body porous material and said substantially flat sheet of full body porous material, and wherein a hydraulic diameter of said channels is between about 0.6 mm and about 6 mm.

11. The gas treatment monolith article according to claim 1, wherein said gas treatment monolith article is a honeycomb article.

12. The gas treatment monolith article according to claim 1, wherein the acid gas is $CO_2$.

13. A method comprising conducting a temperature swing absorption process for gas separation in a reactor comprising the gas treatment monolith article according to claim 1.

14. A method comprising capturing acid gas with the gas treatment monolith article according to claim 1, wherein the acid gas is a flue gas, ambient air or a mixture thereof having an acid gas level of about 350 ppm or above.

15. The gas treatment monolith article according to claim 1, wherein the aluminium oxide coating is homogeneously distributed within channel walls between adjacent channels.

\* \* \* \* \*